No. 759,516. PATENTED MAY 10, 1904.
P. A. GUYE.
PROJECTILE FOR LOADING PRACTICE.
APPLICATION FILED JUNE 8, 1903.
NO MODEL. 4 SHEETS—SHEET 1.
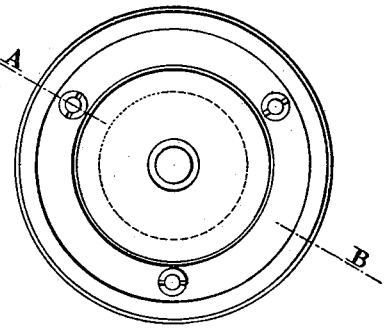
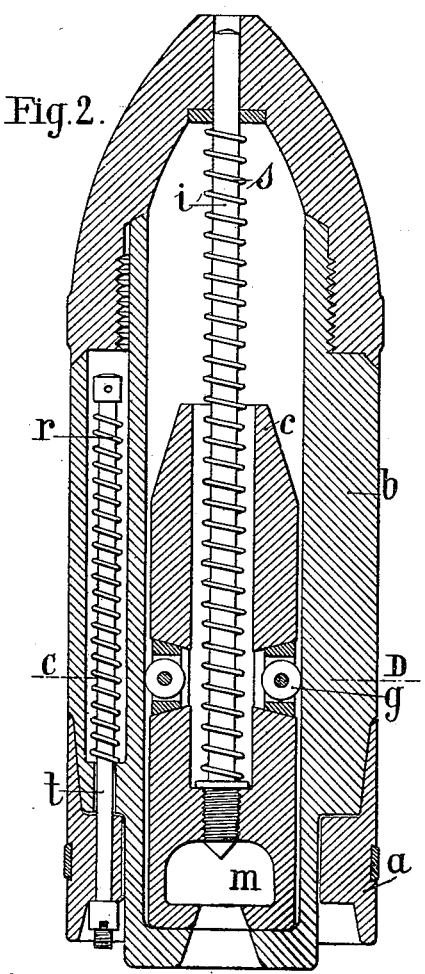
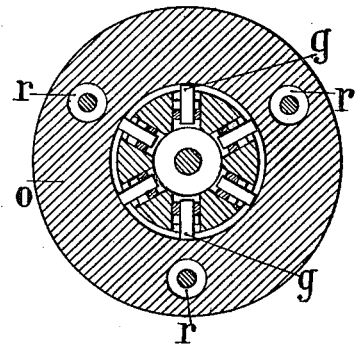

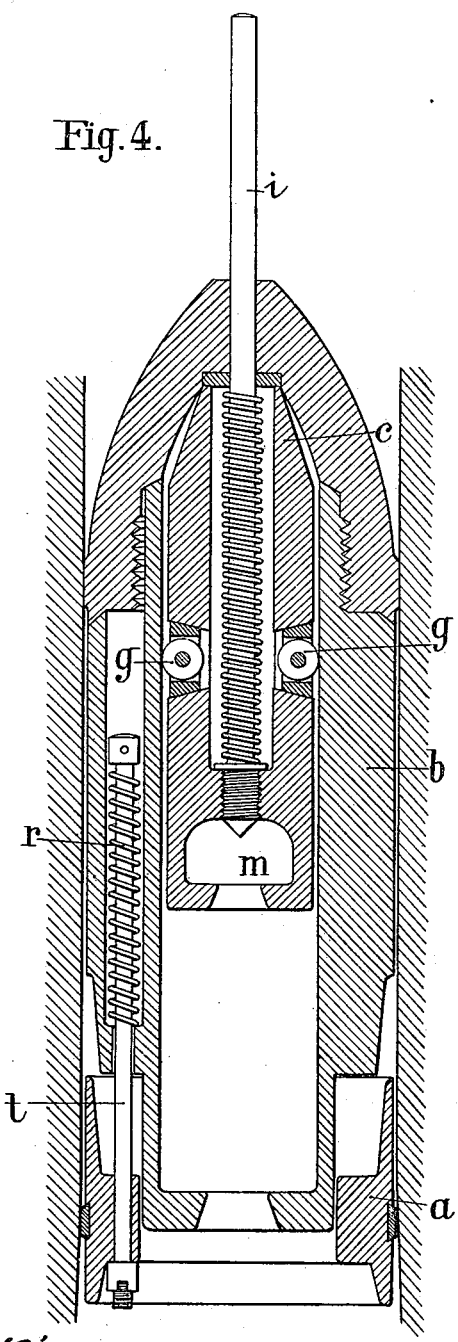
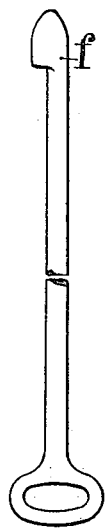

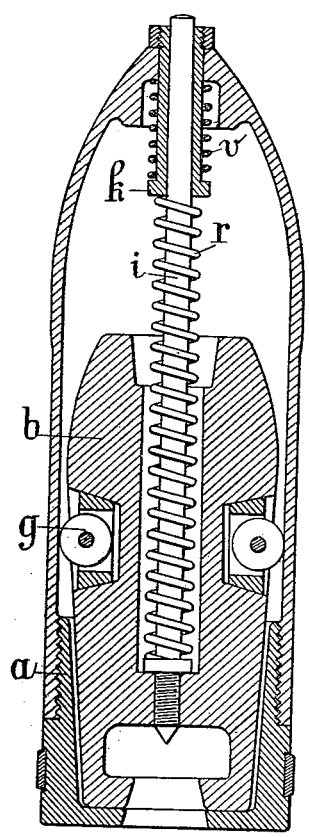
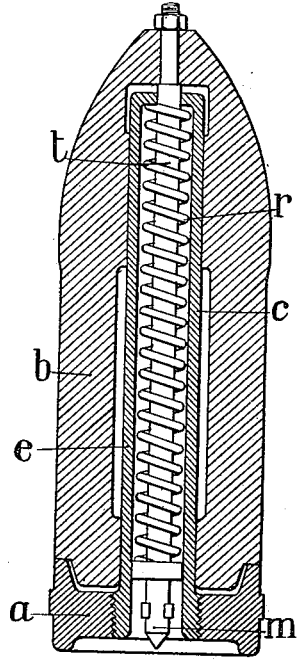
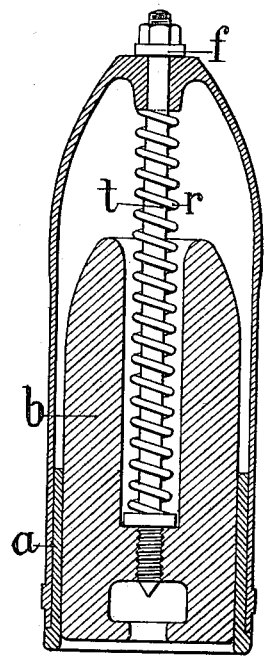

No. 759,516. PATENTED MAY 10, 1904.
P. A. GUYE.
PROJECTILE FOR LOADING PRACTICE.
APPLICATION FILED JUNE 8, 1903.
NO MODEL. 4 SHEETS—SHEET 4.
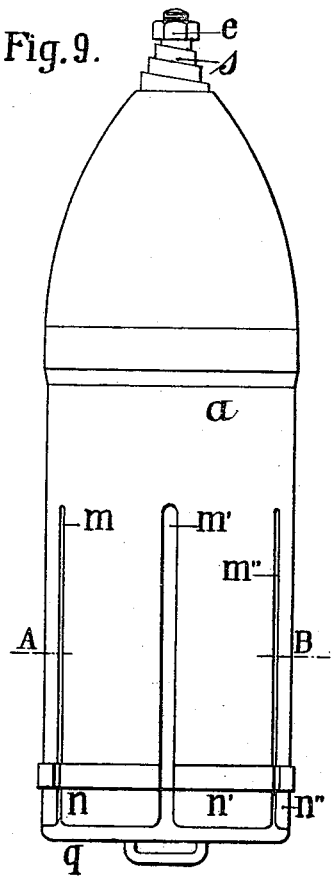
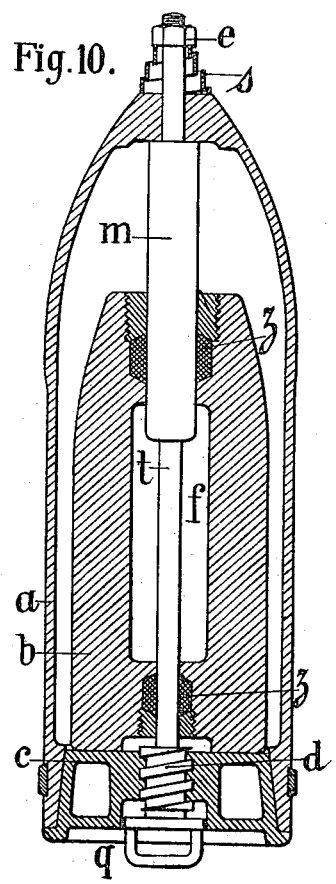
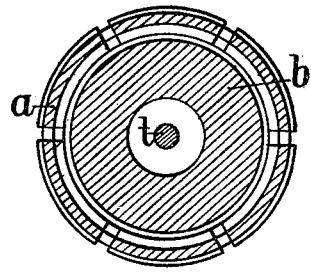

No. 759,516.

Patented May 10, 1904.

UNITED STATES PATENT OFFICE.

PAUL ALEXIS GUYE, OF PARIS, FRANCE.

PROJECTILE FOR LOADING PRACTICE.

SPECIFICATION forming part of Letters Patent No. 759,516, dated May 10, 1904.

Application filed June 8, 1903. Serial No. 160,605. (No model.)

*To all whom it may concern:*

Be it known that I, PAUL ALEXIS GUYE, engineer, of 42 Rue d'Anjou, Paris, in the Republic of France, have invented a certain new and useful Projectile for Loading Practice; and I do hereby declare the following to be a full, clear, and exact description of the invention, such as will enable others skilled in the art to which it appertains to make and use the same.

In all breech-loading ordnance the introduction of the projectile is limited by the contact of the forcing-belt against the walls of an extremely elongated cone which connects the front extremity of the chamber with the commencement of the rifling. Impelled or pushed with the force necessary for ramming it home the projectile becomes firmly wedged in this cone. Having become wedged in this cone, it cannot be extracted except by means of special methods which require special appliances and the expenditure of a considerable amount of time. By reason of this difficulty loading practice has not hitherto included the introduction of the projectile. The operation has been confined to presenting it at the entrance to the chamber and to a simulated impulsion. In fact, the most important operation is omitted. In ordnance of large caliber this operation demands of the servers a knack which can only be acquired with practice. The instruction of the gun's crew is still more defective when the guns are provided with a mechanical loading appliance operated by manual effort or in any other manner. In order to permit of fully carrying out the loading operation under all circumstances, I have devised a special projectile which reduces in a very large degree the effects of the forcing, so that the projectile can be afterward readily extracted.

My projectile is constituted in particular by two independent masses fitted one within the other and connected by a member which presents opposition to their disconnection. The forcing-band of the projectile is adherent to one of these masses, which thus serves as the base. As soon as this band comes into contact with the walls of the cone of the chamber the "base mass" is suddenly arrested. The other mass, which I will call the "free mass," continues its movement and then stops under the influence of the connecting member, which opposes its separation. Owing to the compression of this connecting member this mass returns upon itself and produces against the base mass a shock in the inverse direction, which tends to dislodge the forcing-band. As the base mass, which has been suddenly arrested, only represents a fraction of the weight despatched, the adhesion of the band to the cone of the chamber is reduced in an approximately equal proportion; but owing to the extremely elongated proportions of the cone the inverse shock produced by the return of the free mass is not sufficient to entirely free the fixed mass. This operation is completed by means of an unwedging device.

Various constructional forms of my invention are represented in Figures 1 to 11 of the accompanying drawings. Figs. 1 to 5, inclusive, relate to the first of these forms. Fig. 1 is a view of the base of the projectile. Fig. 2 is a longitudinal section on the line A B of Fig. 1. Fig. 3 is a cross-section on C D of Fig. 2. Fig. 4 is a longitudinal section showing the elements of the projectile in the position which they occupy shortly after the stoppage of the base mass. Fig. 5 is an elevation of the extractor-hook.

The constituent parts of the projectile are a base mass $a$, adapted to be suddenly stopped and formed by a hollowed-out base into which the forcing-band is let; a free mass $b$, partly fitted into the base and comprising the ogive and the cylindrical portion of the projectile; an antagonistic or recoil member composed of three springs $r$ in tension, arranged in cylindrical housings formed in the thickness of the wall of the free mass $b$, these springs maintaining this latter in contact with the base by the tractive effort which they exert upon the rods $t$, which serve to guide them, and, finally, an unwedging device, which is a kind of rolling hammer constituted by a second free mass $c$, by a spring resistance $s$, and by a guide-rod $i$. This hammer may be alternately pressed forward and drawn back by means of a hook $f$, Fig. 5, which is engaged in the recess *m*, formed for this purpose in the bottom of the hammer part. The mass travels upon radial rollers *g*.

The operation is as follows: Before and during the movement of translation of the projectile within the chamber the respective positions of the parts are as described above and represented in Fig. 2. As soon, however, as the forcing-band makes contact with the walls of the cone of the chamber the dislocation of these parts is produced in the manner represented in Fig. 4. The base mass *a* stops and becomes wedged in the cone. The free mass *b* continues its movement, compressing the springs *r*; and stops when its inertia is completely absorbed by the resistance of these springs. It then returns upon itself and produces against the base mass *a* a shock in the inverse direction to the direction of despatch, and this shock commences the loosening of the band. The hammer *c* also travels forward and returns upon itself. The complete release of the band is effected by internal shocks, also in the inverse direction, which are produced on the rear of the projectile by vigorously pressing and drawing back the hammer with the extractor-hook *f*, mentioned above.

Fig. 6 is a longitudinal section of a second constructional form of my invention. The operation is the same as in the first form; but the displacement of the free mass is utilized for completing the disengagement of the belt. The base mass *a* is prolonged by a thin casing, which is given the external form of the cylindrical portion and of the ogive of the projectile. The free mass *b*, furnished with rollers *g* and a guide *i*, is displaced within this casing. A spring *r* maintains it in position at the bottom of the base. This free mass *b* being intended to serve as an unwedging hammer, the strength of the spring *r* should not exceed the thrust which a man is readily able to produce by operating the extractor-hook. Owing to the necessity for this and also of the weight of the free mass the limit strength of the spring *r* should not absorb more than a portion of the *vis viva* of this mass. The excess of this force is absorbed and returned at the end of the travel by a buffer *k*, provided with a more powerful spring *v*.

Fig. 7 is a longitudinal section of a third constructional form, comprising only one spring, and in which the displacement of the free mass may be employed for completing the disengagement. The base mass is composed of a forcing-washer *a*, surmounted by a central tube *e*. The free mass *b*, constituted by the body and the ogive of the projectile, is fitted upon the exterior of this tube *e*. The two masses *a* and *b* are maintained in contact by the tension of a central spring *r*, acting upon the front of the tube and upon a rod *t*, fixed upon the head of the ogive. The thrust and sudden return movement of the free mass are obtained by means of a socket-key fitting in a sleeve *m*, provided with tenons forming the rear prolongation of the rod.

Fig. 8 shows in longitudinal section a fourth constructional form in which the free mass also serves as an unwedging-hammer and in which in addition the *vis viva* arising from the displacement of the rammer is also absorbed. The projectile is constituted in the following manner: The base mass *a*, formed of a complete casing open at the rear and internally reinforced by a ring of hard metal, which opposes deformation of the belt, and a free mass *b*, provided with a rod *t*. These two masses are prevented from separating by means of a washer *f*, retained by a nut. A spring *r* in tension opposes the forward movement of the mass *b*. Complete unwedging is obtained, as in the second and third constructional forms, by means of alternating movements imparted to the free mass. The shocks act upon the head of the ogive.

Figs. 9, 10, and 11 represent a fourth constructional form of my invention. Fig. 9 is an external elevation of the projectile. Fig. 10 is a longitudinal section on the axis of the projectile. Fig. 11 is a cross-section on the line A B of Fig. 9. Its constructional form is characterized by the employment of an atmospheric recuperator and of an unwedging device capable of acting either automatically or as desired. The constituent parts are as follows: The base mass *a*, mainly constituted by a cylindro-ogival casing closed at its base by a movable bottom part *c*, fitting upon outwardly-flanged portions having the form of a truncated cone. The lower cylindrical portion of this casing is fringed throughout its contour by longitudinal slits *m n m' n' m'' n''*, which divide this portion into flexible strips having a tendency to bend toward the center, an internal rod *t* connecting the bottom *c* of the casing *a* by means of the screw-thread *d* and of the nut *e*, which compresses the spring *s*. This rod *t* is rigid with the sleeve *m*, which constitutes the piston of the recuperator. The free mass *b* is provided at its middle portion with a recess *f*. This mass is movable upon the rod *t* and upon the sleeve *m*. Independently of its special purpose it serves as a cylinder for the atmospheric recuperator. To this end the recess *f* is filled with compressed air, and the passages of the rod and of the sleeve are provided with joints *z*. The charge of air is admitted through a passage traversing the rod. When the base mass suddenly stops, the free mass acts in the same manner as described with reference to the preceding constructional forms. Upon its return it strikes and forces back the bottom *c* into its truncated conical housing. This recoil movement serves to compress the spring *s* and to bring together the fringed portions of the base mass. The forcing-band is then unwedged. At the same moment the projectile automatically releases itself by a slight recoil movement produced by the extension of the spring s. Complete unwedging may also be obtained by means of a movement of rotation in the proper direction imparted to the screw-threaded rod t by means of a hook engaged in the handle q. As the rod cannot move forward, the rotation of the screw-threaded portion tends to remove the truncated conical bottom c. When the bottom c is at the recoil, the hook engaged in the handle q is retained by the edges of the cylindrical housing. In order to withdraw it, it is necessary to cause the truncated conical bottom to return to its initial position, which prevents any incorrect maneuver.

What I claim, and desire to secure by Letters Patent of the United States, is—

1. A dummy or drill projectile having a plurality of members movable relatively to each other longitudinally of the projectile, and a tension device connecting said parts, whereby the parts are caused to resume their normal relative positions from which they are displaced in the act of loading.

2. A dummy or drill projectile having a plurality of members movable relatively to each other longitudinally of the projectile, and a recuperative device placed under tension by the movement of one member relative to another in the act of loading, whereby the parts are returned to their normal relative positions when the loading force is withdrawn.

3. A dummy or drill projectile having a plurality of members movable relatively to each other longitudinally in the act of loading, a forcing-band on one member for engaging the walls of the gun-chamber, and a recuperator or power-storing device connecting the members and restoring them to their normal relative positions when the loading force is removed.

4. A dummy or drill projectile provided with a mass or portion having a forcing-band thereon, a second mass or portion movable relatively thereto, and a tension device connecting said portions.

5. A dummy or drill projectile provided with a mass or portion having a forcing-band thereon, a second mass or portion connected to the first by a sliding-rod connection, whereby the two portions are movable relative to each other, and a spring interposed between said portions tending to draw them toward each other.

6. A dummy or drill projectile composed of a plurality of masses or portions movable relatively to each other, and a yielding connecting member opposing the movement of said portions from each other.

7. A dummy or drill projectile having a base mass or portion, a forcing-band thereon, a free mass or portion movable longitudinally relatively to said base mass, and a yielding device connecting said masses or portions and opposing their separation.

8. A dummy or drill projectile having a base mass or portion, a forcing-band thereon, a free mass or portion movable longitudinally relatively to the base mass or portion, a headed rod secured to one of said portions and slidable through a bearing in the other portion, and a spring reacting between one of said portions and an abutment on said rod.

9. A dummy or drill projectile having a base mass or portion, a cylindrical free mass or portion movable relative to said base mass or portion, a hammer mass or portion movable within said cylindrical free mass, a yielding connection between said base and free masses, and a tension device resisting the forward movement of said hammer portion within said cylindrical mass or portion.

10. A dummy or drill projectile having a base mass or portion, a forcing-band thereon, a hollow cylindrical free mass or portion, headed rods secured to the base mass and having sliding connection with the free mass, springs surrounding said rods, a hammer mass or portion movable longitudinally within said free mass, a rod secured to said hammer mass and having sliding connection with said free mass, and a spring surrounding said last-named rod.

11. A dummy or drill projectile having a base mass or portion, a forcing-band thereon, a hollow cylindrical free mass or portion, headed rods secured to the base mass and having sliding connection with the free mass, springs surrounding said rods, a hammer mass or portion movable longitudinally within said free mass, antifrictional bearings between said free and hammer masses, a rod secured to said hammer mass and having sliding connection with said free mass, and a spring surrounding said last-named rod.

In witness whereof I have hereunto set my hand in presence of two witnesses.

PAUL ALEXIS GUYE.

Witnesses:
 LOUIS GARDET,
 J. ALLISON BOWEN.